United States Patent [19]
McCabe

[11] 4,238,110
[45] Dec. 9, 1980

[54] ELECTROMAGNETIC FUEL METERING VALVE ASSEMBLY

[75] Inventor: Ralph P. McCabe, Troy, Mich.

[73] Assignee: Colt Industries Operating Corp., New York, N.Y.

[21] Appl. No.: 59,779

[22] Filed: Jul. 23, 1979

[51] Int. Cl.³ .............................................. F16K 31/06
[52] U.S. Cl. ..................................... 251/129; 251/141
[58] Field of Search ........................... 251/141, 129

[56] References Cited
U.S. PATENT DOCUMENTS

| 2,644,662 | 7/1953 | Powers | 251/141 X |
| 3,368,789 | 2/1968 | Martin | 251/141 |
| 3,459,404 | 8/1969 | Wisniewski | 251/141 |

*Primary Examiner*—Arnold Rosenthal
*Attorney, Agent, or Firm*—Walter Potoroka, Sr.

[57] ABSTRACT

A fuel metering valve assembly is shown as having a bobbin carrying a solenoid winding and a pole piece within the bobbin as well as an armature carried within the bobbin and axially juxtaposed to the pole piece; a valve member carried by the armature serves to generally cyclically open and close coacting orifice means also carried by the bobbin.

17 Claims, 8 Drawing Figures

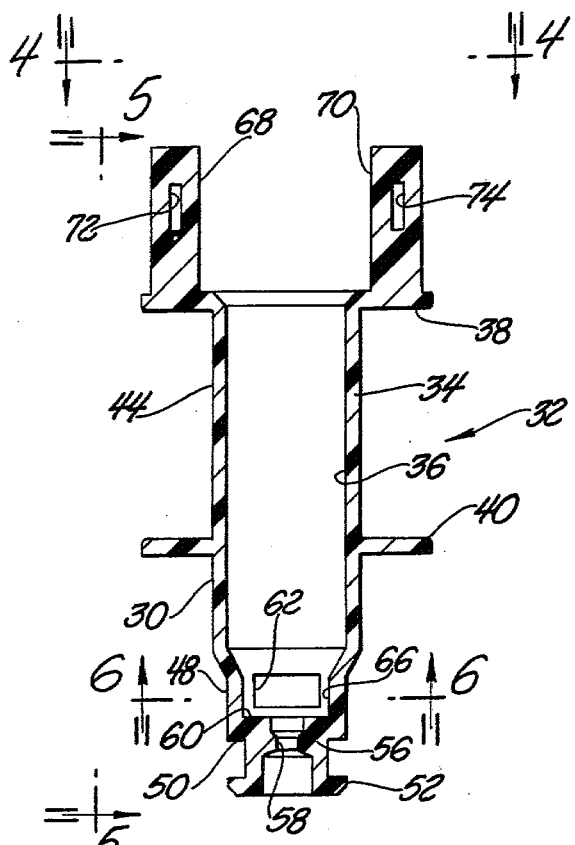
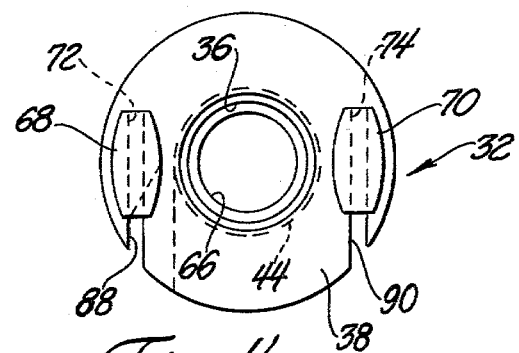
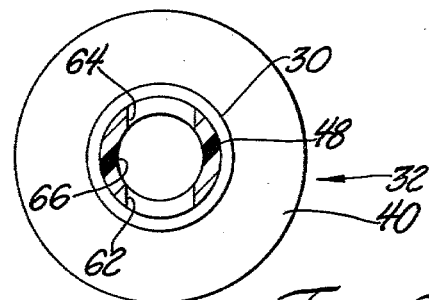
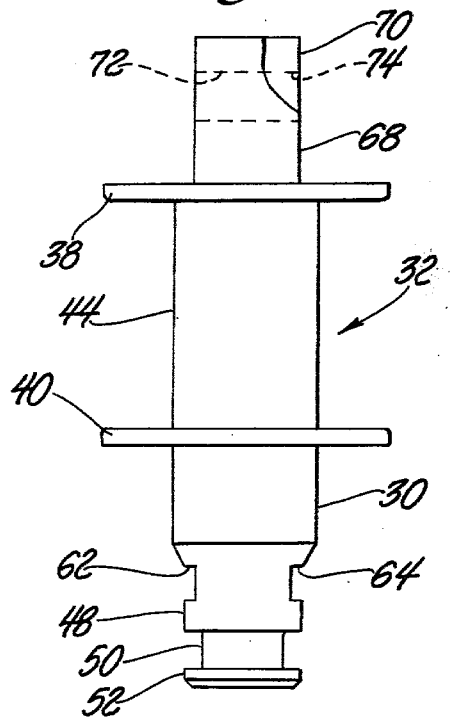
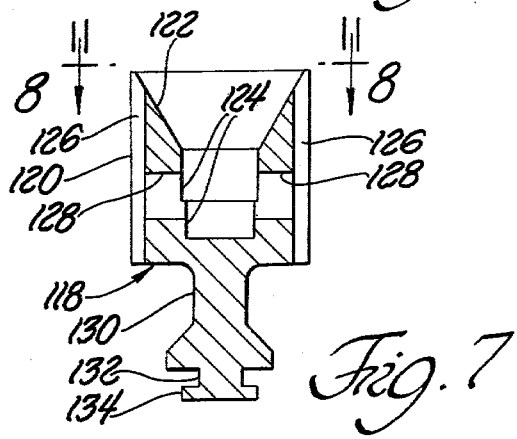
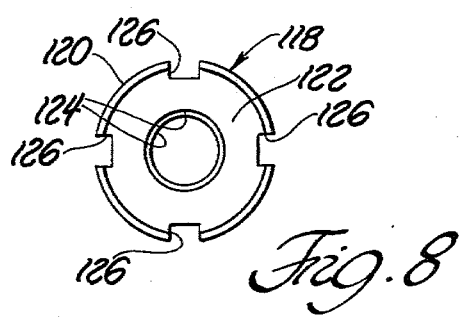

ELECTROMAGNETIC FUEL METERING VALVE ASSEMBLY

FIELD OF THE INVENTION

This invention relates generally to electromagnetic fuel metering valve assemblies and in particular to those which are effective to determine the metered rate of fuel flow through a reciprocating-like motion of a valving member, comprising a portion thereof, relative to a cooperating valving flow orifice.

BACKGROUND OF THE INVENTION

Even though the automotive industry has over the years, if for no other reason than seeking competitive advantages, continually exerted efforts to increase the fuel economy of automotive engines, the gains continually realized thereby have been deemed by various levels of government to be insufficient.

Further, such levels of government have also imposed regulations specifying the maximum permissible amounts of carbon monoxide (CO), hydrocarbons (HC) and oxides of nitrogen ($NO_x$) which may be emitted by the engine exhaust gases into the atmosphere.

Unfortunately the available technology employable in attempting to attain increases in engine fuel economy is, generally, contrary to that technology employable in attempting to meet the governmentally imposed standards on exhaust emissions.

For example, the prior art, in trying to meet the standards for $NO_x$ emissions, has employed a system of exhaust gas recirculation whereby at least a portion of the exhaust gas is re-introduced into the cylinder combustion chamber to thereby lower the combustion temperature therein and consequently reduce the formation of $NO_x$.

The prior art has also proposed the use of engine crankcase recirculation means whereby the vapors which might otherwise become vented to the atmosphere are introduced into the engine combustion chambers for burning.

The prior art has also proposed the use of fuel metering means which are effective for metering a relatively overly-rich (in terms of fuel) fuel-air mixture to the engine combustion chamber means as to thereby reduce the creation of $NO_x$ within the combustion chamber. The use of such overly rich fuel-air mixtures result in a substantial increase in CO and HC in the engine exhaust, which, in turn, requires the supplying of additional oxygen, as by an associated air pump, to such engine exhaust in order to complete the oxidation of the CO and HC prior to its delivery into the atmosphere.

The prior art has also heretofore proposed retarding of the engine ignition timing as a further means for reducing the creation of $NO_x$. Also, lower engine compression ratios have been employed in order to lower the resulting combustion temperature within the engine combustion chamber and thereby reduce the creation of $NO_x$.

The prior art has also proposed the use of fuel metering injection means instead of the usually-employed carbureting apparatus and, under superatmospheric pressure, injecting the fuel into either the engine intake manifold or directly into the cylinders of a piston type internal combustion engine. Such fuel injection system, besides being costly, have not proven to be generally successful in that the system is required to provide metered fuel flow over a very wide range of metered fuel flows. Generally, those injection systems which are very accurate at one end of the required range of metered fuel flows, are relatively inaccurate at the opposite end of that same range of metered fuel flows. Also, those injection systems which are made to be accurate in the mid-portion of the required range of metered fuel flows are usually relatively inaccurate at both ends of that same range. The use of feedback means for altering the metering characteristics of a particular fuel injection system have not solved the problem because the problem usually is intertwined with such factors as: effective aperture area of the injector nozzle; comparative movement required by the associated nozzle pintle or valving member; inertia of the nozzle valving member and nozzle "cracking" pressure (that being the pressure at which the nozzle opens). As should be apparent, the smaller the rate of metered fuel flow desired, the greater becomes the influence of such factors thereon.

It has been and still is anticipated that said various levels of government will be establishing even more stringent exhaust emission limits of, for example, 1.0 gram/mile of $NO_x$ (or even less).

The prior art, in view of such anticipated requirements with respect to $NO_x$, has suggested the employment of a "three-way" catalyst, in a single bed, within the stream of exhaust gases as a means of attaining such anticipated exhaust emission limits. Generally, a "three-way" catalyst (as opposed to the "two-way" catalyst system also well known in the prior art) is a single catalyst, or catalyst mixture, which catalyzes the oxidation of hydrocarbons and carbon monoxide and also the reduction of oxides of nitrogen. It has been discovered that a difficulty with such a "three-way" catalyst system is that if the fuel metering is too rich (in terms of fuel), the $NO_x$ will be reduced effectively, but the oxidation of CO will be incomplete. On the other hand, if the fuel metering is too lean, the CO will be effectively oxidized but the reduction of $NO_x$ will be incomplete. Obviously, in order to make such a "three-way" catalyst system operative, it is necessary to have very accurate control over the fuel metering function of associated fuel metering supply means feeding the engine. The prior art has suggested the use of fuel injection means with associated feedback means (responsive to selected indicia of engine operating conditions and parameters) intended to continuously alter or modify the metering characteristics of the fuel injection means. However, such prior art fuel injection systems have not proven to be successful and such, it is believed, is due primarily to the actual fuel metering means which, apparently, lack the accuracy and responsiveness, to changes in engine demands, necessary to provide the required very accurate metered fuel flow throughout the entire range of engine operating conditions.

It has also heretofore been proposed to employ a fuel metering means, of a carbureting type, with feedback means responsive to the presence of selected constituents comprising the engine exhaust gases. Such feedback means were employed to modify the action of a main metering rod of a main fuel metering system of a carburetor. However, tests and experience have indicated that such prior art carburetor and such a related feedback means cannot, at least as presently conceived, provide the degree of accuracy required in the metering of fuel to an associated engine to assure meeting, for example, the said anticipated exhaust emission standards. Again, in such systems, it appears that the failing resides primarily in the actual fuel metering means which, apparently, lack the accuracy and responsiveness, to changes in engine demands, necessary to provide the required very accurate metered fuel flow throughout the entire range of engine operating conditions.

Accordingly, the invention as disclosed, described and claimed is directed generally to the solution of the above and related and attendant problems and more specifically to structure and apparatus effective for providing very accurate metering of fuel flow.

SUMMARY OF THE INVENTION

According to one aspect of the invention, a metering valving assembly for metering rates of liquid flow has a metering orifice and a cooperating metering valve member, a solenoid winding is situated as to upon energization and deenergization influence the position of the metering valve member with respect to the metering orifice, the solenoid winding is energized as through related control means responsive to and reflective of engine fuel requirements to thereby reciprocatingly move the metering valve member toward and away from the cooperating metering orifice and thereby control the metering through said metering orifice which results in the required rate of metered fuel flow therethrough.

Various general and specific objects, advantages and aspects of the invention will become apparent when reference is made to the following detailed description of the invention considered in conjunction with the accompanying drawings.

BRIEF DESCRIPTION OF THE DRAWINGS

In the drawings wherein for purposes of clarity certain details and/or elements may be omitted from one or more views:

FIG. 3 is a cross-sectional view, in enlarged scale, of one of the elements illustrated in FIG. 2 taken generally on the plane of line 3—3 of FIG. 2 and looking in the direction of the arrows;

FIG. 4 is a top plan view of the structure of FIG. 3 taken generally on the plane of line 4—4 of FIG. 3 and looking in the direction of the arrows;

FIG. 5 is a side elevational view of the structure of FIG. 3 taken generally on the plane of line 5—5 of FIG. 3 and looking in the direction of the arrows;

FIG. 6 is a cross-sectional view taken generally on the plane of line 6—6 of FIG. 3 and looking in the direction of the arrows;

FIG. 7 is an enlarged view, in axial cross-section, of another of the elements shown in FIG. 2; and FIG. 8 is a top plan view of the structure of FIG. 7 taken generally on the plane of line 8—8 of FIG. 7 and looking in the direction of the arrows;

DETAILED DESCRIPTION OF THE PREFERRED EMBODIMENT

Figure 1:
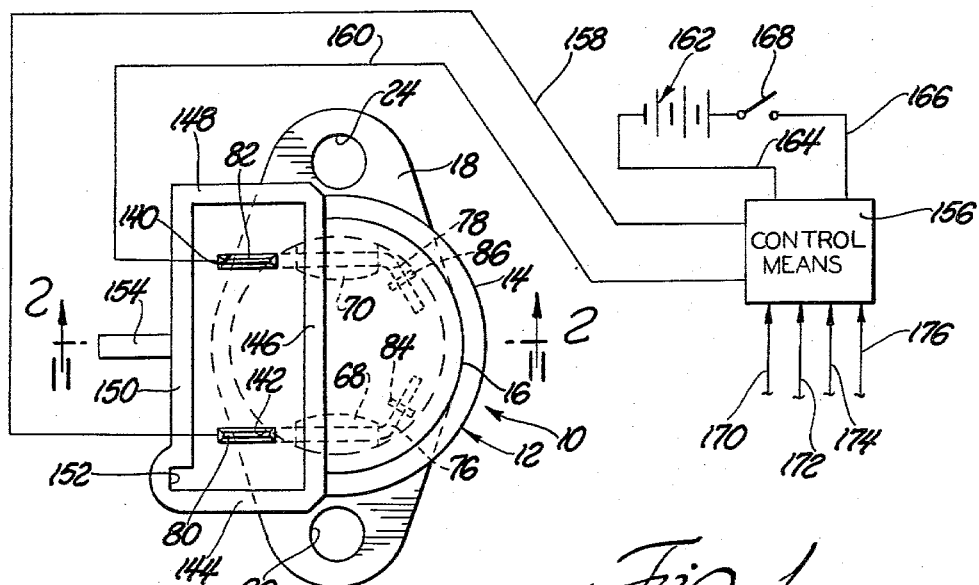
FIG. 1 is a top plan view of a metering valving assembly, employing teachings of the invention, along with schematically depicted control means and circuitry.
Figure 2:
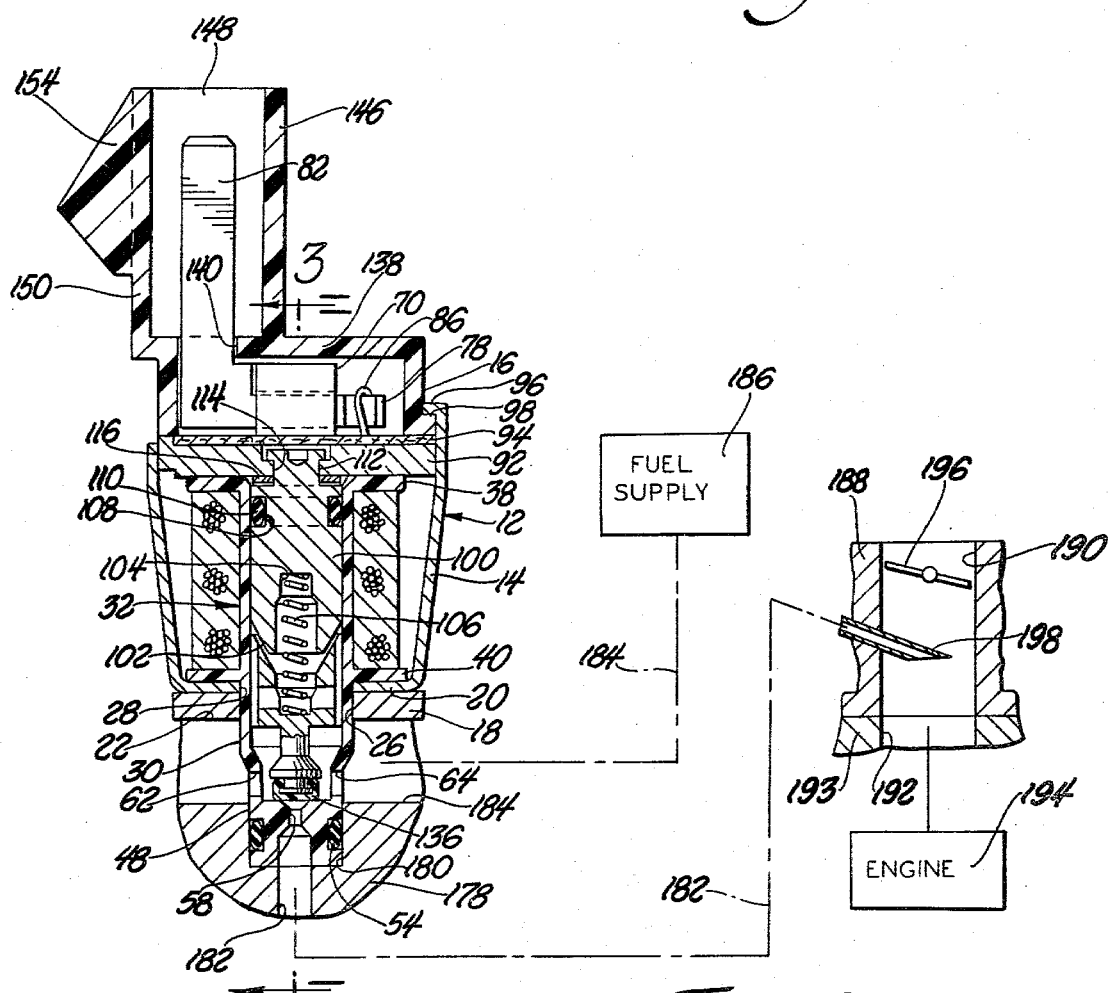
FIG. 2 is a cross-sectional view taken generally on the plane of line 2—2 of FIG. 1 and looking in the direction of the arrows.

Referring now in greater detail to the drawings, FIGS. 1 and 2 illustrate the metering valving assembly 10 as comprising housing means 12 which, in turn, may be comprised of a first cup-like housing section 14 and a second capping-like housing section 16. In the preferred embodiment, housing section 16 is comprised of electrically non-conductive plastic material such as, for example, "ZYTEL" ("Zytel" being a trademark of the E. I. DuPont de Nemours & Co. for a nylon resin available for use as, for example, a molding powder or extrusion powder.) A mounting flange 18, suitably secured to the end wall 20 of housing section 14 as by brazing, serves as a mounting means for mounting the assembly 10 as to related support means 22 and securing such as by screws (not shown) extending through apertures 24 and 26 of flange 18 and into such support means 22. The support or mounting flange 18 and end wall 20 have aligned apertures 26 and 28 formed therethrough for closely receiving a generally tubular projecting portion or extension 30 of a bobbin structure 32.

As also shown in FIGS. 3–6, the bobbin structure 32 comprises a generally cylindrically tubular body portion 34 with an inner cylindrical passage 36 and axially spaced generally transversely situated radially extending annular walls 38 and 40. A solenoid winding or coil 42 is situated generally about outer surface 44 of body portion 34 and axially between spaced walls 38 and 40. The extension 30 may have its larger outer surface 46 of the same diameter as 44 and its inner surface may be an extension of the inner cylindrical passage 36.

The extension 30 has a generally necked-down, still further extending, portion 48. Near the end portion 48, an annular groove 50 is formed in the outer surface 52 for use in receiving an "O-ring" seal 54. Generally at or near the end of portion 48, a transverse wall 56 is formed with calibrated passage means 58 extending therethrough. Preferably, the wall portion 56 is formed with a surface 60 which may be considered as being, in effect, a valve orifice surface. As also illustrated in FIG. 6, the extension 48 is provided with passage means 62 and 64 formed therethrough as to complete communication as between the interior and exterior thereof. As best shown in FIG. 3, passage 36 extends, as by a reduced passage portion 66, into extension 48 as to communicate with passage means or openings 62 and 64.

The upper end or flange 38 of the spool-like structure 32 is provided with preferably integrally formed pedestal-like contact anchors or supports 68 and 70 respectively provided with slots 72 and 74 which, in turn, respectively closely receive legs 76 and 18 of electrical contacts 80 and 82 (also see FIGS. 1 and 2). As best seen in FIG. 4, the upper flange or wall 38 is preferably provided with a pair of clearance slots 88 and 90 which respectively receive and permit the passage therethrough of electrical lead portions 84 and 86 of solenoid winding 42.

A disc-like solenoid end plate 92 is provided with slots similar to and situated in alignment with slots 88 and 90; further, such end 92 is provided with clearance apertures for the respective reception therethrough of pedestal-like contact anchor portions 68 and 70. Similarly, a disc-like gasket 94 is provided with slots, similar to and situated in alignment with slots 88 and 90, and clearance apertures for the respective reception therethrough of pedestal-like contact anchor portions 68 and 70.

As best shown in FIG. 2, the solenoid end plate 92 is axially juxtaposed to upper end wall 38 of bobbin structure 32 while gasket 94 is, in sequence, axially juxtaposed to solenoid end plate 92. When upper housing section 16 is placed atop and against gasket 94 and the upper end 96 of housing section 14 is spun or otherwise formed over onto a cooperating flange portion 98 of housing section 16, the gasket 94, solenoid end plate 92 and bobbin structure 32 are forced downwardly (as viewed in FIG. 2) causing annular wall 40 of bobbin 32 to be seated against the end wall 20 of housing section 14.

As shown in FIG. 2, a pole piece member 100, closely received within passage 36 of bobbin member 32, is of generally cylindrical configuration having a generally conical end face surface 102 and an axially extending cylindrical recess 104 which receives one end of a compression spring 106 therein. An annular recess or groove 108, formed as at or near the opposite end of pole piece member 100, if effective for receiving and retaining a suitable, for example "O-ring", seal 110 for affecting a seal with the surface of passage means 36 of bobbin structure 32.

The upper (as viewed in FIG. 2) end of pole member 100 has an extension 112 which extends through an aperture 114 in solenoid end plate 92 and which is peened or otherwise formed-over as to thereby mechanically lock pole member 100 to solenoid end plate 92. Suitable shimming means as in the form of, for example, annular insert or spacer means 116 may be situated generally about pole piece extension 112 and between the end shoulder or end face of pole piece 100 and solenoid end plate 92 to thereby obtain a desired axial location of pole piece end face 102. An alternate, for example, of securing pole piece 100 to plate 92 is to thread each of pole piece 100 and plate 92 and after threadable engagement therebetween and threadable axial adjustment of pole piece 100, relative to plate 92 locking both the plate 92 and pole piece 100 together as by welding or the employment of suitable cementing means.

As shown in FIG. 2, an armature member 118 (also shown in FIGS. 7 and 8) is closely slidably received within passage 36 of bobbin member 32. As best seen in FIGS. 7 and 8, armature member 118 has a main body portion 120 of generally cylindrical configuration with an upper end (as viewed in FIGS. 2 and 7) surface or face 122 of generally concave conical configuration which, at its lower end, communicates with a centrally disposed recess or passage means 124 which also serves to receive the opposite end of spring means 106. Also, the outer surface of main body portion 120 has a plurality of circumferentially spaced axially extending slots or recesses 126 formed therein. Further, in the preferred embodiment generally radially extending passage or conduit means 128 is provided as to complete communicate between passage means 124 and, for example, at least a pair of axial recesses or slots 126.

An extension 130 depending from body portion 120 terminates as in a necked-down portion 132 and an annular flange portion 134. As shown in FIG. 2 an insert-like valve member 136, of generally cup-shaped configuration, is carried against the lower end of extension 130 and suitably secured thereto as by a radially inwardly directed flange-like portion of such member 136 being received within and retained by the necked-down portion or annular recess 132 of armature extension 130. In the preferred embodiment, such valve member 136 is comprised of plastic material such as, for example, "VITON" ("Viton" being a trademark of the E. I. duPont de Nemours & Co. for fluoroelastomers based on the copolymer of vinylidene fluoride and hexafluoropropylene).

It has been discovered that, for example, positioning of the armature face 122 an axial distance of 0.015 to 0.030 inch away from the face 102 of the pole piece 100 apparently physically places the armature 118 in a position where it is acted upon by a selected portion of the magnetic force generated by the energization of the solenoid winding 42. whereby, simultaneously, the armature means 118 and valve 136 are assured of being moved sufficiently away from orifice 58, to thereby make the flow through orifice means 58 insensitive to possible variations induced in or experienced by the axial position of the valve member 136, and still be under the influence of a sufficient field of strength. Accordingly, in assembling the various components, with the armature 118 in its down-most position whereat valve member 136 totally closes communication through passage or conduit means 58, shim means 116 are selected of a thickness as to result, preferably, in the axial space between juxtaposed surfaces 102 and 122 being in the order of 0.015 inch which, in turn, also defines the maximum travel of such armature 118 and valve member 136.

As illustrated in FIGS. 1 and 2, the upper housing section 16 is of a generally inverted cup-like configuration with a transverse or end wall 138 through which are formed slots 140 and 142 for respectively receiving portions of electrical terminals 82 and 80. Further, housing section 16 comprises a preferably integrally formed terminal enclosure comprised as of upstanding walls 144, 146, 148 and 150 which may include a polarizing recess portion 152 for co-action with a mating female-type electrical terminal assembly (not shown). A projecting tab-like portion 154 may be provided as on wall 150 for operative locking engagement with such a co-acting female electrical terminal assembly.

As illustrated in FIG. 1, suitable related control means 156, the specific form of which not forming any part of the invention, is operatively electrically connected as via conductor means 158 and 160 to terminals 80 and 82, respectively. A suitable source of electrical potential 162 is illustrated as being electrically connected to control means 156 as via conductor means 164 and 166 which may suitable energizing switch means 168. As generally schematically depicted, various engine operating parameters and various indicia of engine operation may be sensed as by any suitable means effective for producing related signals in response thereto and applying such as input signals, as at 170, 172, 174 and 176, to control means 156.

The metering valving assembly 10 may be situated in any desired location in any desired structure. As generally depicted in FIG. 2, the entire assembly 10 may be secured as through its flange 18 to suitable related structure 178 as to have the projecting end of bobbin member 32 received within a cooperating recess 180, formed in or provided by structure 178, so as to have passage means 58 in communication with a passage or conduit 182 in structure 178. A chamber or conduit 184 generally surrounding extension 30 and openings 62 and 64 is in communication with a source of fluid supply such as a fuel supply 186. As should be apparent, such a fuel supply need not be at superatmospheric pressure in order to have the metering assembly 10 properly perform its metering function. The structure 178 may be part of or be related to a combustion engine induction system comprising a body 188 with an induction passage 190 formed therethrough and communicating as with the induction passage 192 of an intake manifold 193 of an associated combustion engine 194. The induction passage 190 may be provided with a variably positionable throttle valve 196, for selectively variably restricting the flow of motive fluid therethrough and into engine 194, and fuel discharge nozzle means 198 communicating with conduit means 182 for discharging metered fuel into induction passage means 190.

OPERATION OF INVENTION

Generally, as should be apparent, fuel flows from source or supply 186 through apertures or passages 62 and 64 into the interior of extending portion 30 of bobbin 32 and (when opened) past valve member 136 through passage or orifice means 58 into passage or conduit means 182 and through discharge nozzle means 198 into the induction passage means leading to engine 194.

Neglecting the pressure differential across the metering orifice of any fluid metering system, it is apparent that the other remaining factor for controlling the rate of flow is the effective metering area of such metering orifice. The invention is able to employ any desired pressure differential and therefore such will not be considered. However, the invention varies and determines the effective metering or flow area by, in effect, during a selected span of time alternately fully closing and fully opening passage means 58. That is, the control means 156, which may comprise oscillator means therein, would preferably be the type which would have a fixed cycle time but which, within such cycle time would have a variable "off" time and a correspondingly variable "on" time. The degree to which such "off" and "on" times would be varied would depend upon the signals fed into control means 156 indicating whether a richer or leaner air-fuel mixture was required. In effect, every time that the logic control means 156 was "on", solenoid winding 42 would be energized causing armature 118 and valving member 136 to move upwardly fully opening communication through passage means 58; every time that the logic control means was "off", solenoid winding 42 would be deenergized permitting spring 106 to move armature 118 and valve member 136 downwardly fully closing communication through passage means 58. Obviously, the greater percentage of the cycle time defined by the energization of solenoid winding 42 the greater is the rate of metered fuel flow through passage means 58 and the richer (in terms of fuel) is the fuel-air mixture supplied to the engine 194.

The passage means 126 in armature body 120 are provided as to eliminate any hydraulic locking of the armature 120 and passage means 128 assures for the escape of any fluid which might otherwise tend to be trapped as between opposed faces 102 and 122 of pole piece 100 and armature 118.

It should be apparent that even though the invention has been disclosed and described with reference to its use in a fuel metering system, the invention can be practiced for the metering of fluids and/or liquids other than fuel. Also, as already indicated, the practice of invention is not limited to situations where the upstream pressure, of the fluid to be metered, is superatmospheric. Therefore, the invention may be employed equally well in, for example, fuel metering systems where the upstream pressure is ambient and in fuel metering systems commonly referred to as injection systems even wherein the upstream pressure is substantially superatmospheric.

Although only a preferred embodiment of the invention has been disclosed and described, it is apparent that other embodiments and modifications of the invention are possible within the scope of the appended claims.

What is claimed is:

1. A valving assembly for variably restricting fluid flow, comprising housing means, said housing means comprising a first housing section and a second housing section, said first housing section being of a cup-like configuration and having an end wall and a circumscribing side wall joined to and extending from said end wall as to be terminating in an open end opposite from said end wall, clearance passage means formed through said end wall, a bobbin structure, said bobbin structure comprising a generally tubular axially extending bobbin body and first and second radially outwardly extending annular walls carried by said bobbin body, said first and second annular walls being axially spaced from each other along said bobbin body, electrical coil means carried by said bobbin structure in a manner as to be situated generally about said tubular bobbin body and axially between said first and second annular walls, said tubular bobbin body comprising a tubular extending portion extending axially beyond said second annular wall, first fluid orifice means formed through said tubular extending portion as to provide for communication as between the interior and exterior of said tubular extending portion, a tubular end-wall portion carried by said tubular extending portion, second fluid orifice means formed in said tubular end-wall portion for providing for communication as between the interior and exterior of said tubular extending portion, said bobbin structure being situated within said first housing section as to have said second annular wall operatively axially abutting said end wall and said tubular extending portion extending through said clearance passage means as to be situated generally externally of said first housing section, a pole piece situated generally internally of said tubular bobbin body and fixedly secured against movement relative to said tubular bobbin body, armature means slidably received within said tubular bobbin body and situated axially generally between said pole piece and said tubular end-wall portion, said armature means being movable with respect to said pole piece and said tubular bobbin body, said armature means comprising valving means carried thereby and movable therewith, said valving means being effective to coact with said second fluid orifice means in controlling the flow of fluid therethrough, resilient means operatively engaging said armature means and normally yieldingly urging said armature means and said valving means in a first direction generally toward said end-wall portion thereby moving said valving means toward a position of closing said communication through said second fluid orifice means, said second housing section being operatively fixedly connected to said first housing section generally at said open end thereof as to form an end closure, and first and second electrical terminal means operatively carried by said second housing section, said first and second electrical terminal means being electrically connected to said electrical coil means and effective for electrical connection to an associated source of electrical potential, said electrical coil means being effective upon electrical energization to produce a magnetic field of a strength sufficient to move said armature means and valving means in a second direction opposite to said first direction against the force of said resilient means as to thereby cause said valving means to move away from said second fluid orifice means and complete said communication through said second fluid orifice means.

2. A valving assembly according to claim 1 wherein said pole piece comprises a first axial end face juxtoposed to said armature means, and wherein said first end face is of generally conical configuration.

3. A valving assembly according to claim 2 wherein said generally conical configuration is such as to have the radial innermost portion thereof projecting axially furthermost in the direction of said armature means.

4. A valving assembly according to claim 2 and further comprising recess means formed in said generally conical end face and extending axially into said pole piece.

5. A valving assembly according to claim 4 wherein said resilient means is at least partly received within said recess means.

6. A valving assembly according to claim 2 wherein said armature means comprises a second axial end face juxtoposed to said first axial end face, and wherein said second axial end face is of generally conical configuration.

7. A valving assembly according to claim 6 wherein said general conical configuration of said second axial end face is such as to have the radially outermost portion thereof projecting axially furthermost in the direction of said pole piece.

8. A valving assembly according to claim 6 and further comprising recess means formed in said generally conical second axial end face and extending axially into said armature means.

9. A valving assembly according to claim 8 wherein said resilient means is at least partly received within said recess means.

10. A valving assembly according to claim 1 wherein said armature means comprises an axially extending armature body, wherein said armature body comprises clearance passage defining means for permitting fluid flow generally between said armature body and said tubular bobbin body.

11. A valving assembly according to claim 10 wherein said clearance passage defining means comprises axially extending recess-like means formed in the outer surface of said armature body.

12. A valving assembly according to claim 10 and further comprising interconnecting passage means formed in said armature body, said interconnecting passage means being effective to interconnect that portion of the interior of said tubular bobbin body as exists generally between said pole piece and said armature means with clearance passage means.

13. A valving assembly according to claim 1 and further comprising mounting means, said mounting means being situated generally between and operatively contained by said second housing section and said bobbin structure, and wherein said pole piece is fixedly connected to said mounting means at a second end of said pole piece axially opposite to said armature means.

14. A valving assembly according to claim 13 and further comprising shim means operatively engaging said pole piece and said mounting means as to cause said pole piece to be axially spaced from said armature means a preselected distance when said armature means is moved the maximum distance in said first direction.

15. A valving assembly according to claim 13 wherein said bobbin structure comprises first and second terminal engaging portions, wherein said first and second terminal engaging portions extend through said mounting means, and wherein said first and second electrical terminal means are respectively operatively connected to said first and second terminal engaging portions.

16. A valving assembly according to claim 1 wherein said valving means comprises a cup-like valve member.

17. A valving assembly according to claim 16 wherein said cup-like valve member is comprised of plastic material.

* * * * *